United States Patent [19]
Toda et al.

[11] Patent Number: 5,448,570
[45] Date of Patent: Sep. 5, 1995

[54] SYSTEM FOR MUTUAL SYNCHRONIZATION AND MONITORING BETWEEN BASE STATIONS

[75] Inventors: Yasushi Toda; Tetsuya Yuda, both of Tokyo, Japan

[73] Assignee: Kyocera Corporation, Kyoto, Japan

[21] Appl. No.: 213,979

[22] Filed: Mar. 16, 1994

[30] Foreign Application Priority Data

Mar. 17, 1993 [JP] Japan .................................. 5-082538
Mar. 17, 1993 [JP] Japan .................................. 5-082539

[51] Int. Cl.$^6$ .......................... H04L 7/10; H04B 7/212
[52] U.S. Cl. .................................. 370/95.3; 370/29; 370/103; 455/51.1
[58] Field of Search ................. 455/33.1, 49.1, 50.1, 455/51.1; 379/63; 371/42, 47.1; 370/29, 95.3, 103, 105.3; 307/107, 109; 340/825.2, 825.21

[56] References Cited

U.S. PATENT DOCUMENTS

| | | | |
|---|---|---|---|
| 4,513,416 | 4/1985 | Fujiwara | 370/100.1 |
| 4,817,089 | 3/1989 | Paneth et al. | 370/95.3 |
| 5,124,698 | 6/1992 | Mustonen | 455/51.1 |
| 5,258,980 | 11/1993 | Maebara et al. | 370/95.1 |
| 5,260,944 | 11/1993 | Tomabechi | 370/95.1 |
| 5,268,933 | 12/1993 | Averbuch | 375/107 |
| 5,285,443 | 2/1994 | Patsiokas et al. | 455/51.1 |

FOREIGN PATENT DOCUMENTS 4287532 10/1992 Japan.

*Primary Examiner*—Benedict V. Safourek
*Attorney, Agent, or Firm*—Spensley Horn Jubas & Lubitz

[57] ABSTRACT

A communication system that performs time-division multiple access mobile communication using radio in a service area in which are disposed a plurality of base stations connected to a central station through a communication network. The central station selects and designates a master base station and a selected base station close to the master base station. The central station instructs the selected base station to synchronize a radio signal transmitted by the selected base station with a radio signal transmitted by the master base station. The central station further selects at least one additional base station close to the selected base station. The central station instructs the at least one additional base station to synchronize a radio signal transmitted by the additional base station with a radio signal transmitted by the selected base station. The process is repeated until all of the base stations are transmitting a synchronized radio wave. The central station also sequentially designates base stations to monitor each other, and further gives each base station criteria for judging an abnormality, thereby establishing a monitoring network.

2 Claims, 8 Drawing Sheets

SYSTEM FOR MUTUAL SYNCHRONIZATION AND MONITORING BETWEEN BASE STATIONS

BACKGROUND OF THE INVENTION

The present invention relates to a base station mutual synchronization and monitoring system which is used in a communication network system including a plurality of base stations and a large number of mobile stations, e.g., portable telephones, to effect mutual synchronization and monitoring between the base stations.

TDMA (Time Division Multiple Access) is a technique whereby a plurality of stations are assigned a plurality of channels, respectively, which are obtained by dividing the time base into a plurality of periodically repeated blocks, to effect communication. In the TDMA system, it is important to synchronize channels on the time base, which are assigned to respective base stations. If the channels are not satisfactorily synchronized, the timing at which a signal is transmitted from one base station overlaps the signal transmission timing in another base station, resulting in a lowering of the channel utilization efficiency.

Conventional techniques proposed to overcome the above disadvantage include a method wherein a synchronizing signal is sent from a central station to each base station in a hardware manner. However, this method requires large transmission power and also involves the problem of the difference in radio wave propagation time between a remote base station and a base station close to the central station. In addition, it is necessary to change the control for base stations using different systems.

Techniques proposed to solve these problems include a method disclosed in Japanese Patent Application Laid-Open (KOKAI) No. 04-287532 (1992). According to the disclosed method, no central station is installed, but base stations mutually receive a signal corresponding to each other's synchronizing signal, and each base station compares the received signal with its own transmitted signal, thereby correcting any error in synchronization of the transmitted signal. Thus, synchronization between the base stations is established in a self-distributed manner.

However, the above-described system requires each base station to have a plurality of receivers in order to receive radio waves from other base stations at different timings while maintaining the timing for transmitting its own radio wave.

In addition, since each individual base station shifts its own transmitting timing so as to bring the synchronization error into convergence, an error may be produced in synchronization with a mobile station (personal station) which has been synchronized with the base station concerned.

Further, correction of the transmitting timing which is made to achieve convergence of synchronization newly produces a synchronization error, which causes undulatory vibration. Accordingly, it takes a long time to bring the synchronization into convergence.

Furthermore, in the above-described communication system, each individual base station is not constantly monitored. Therefore, occurrence of an abnormality is discovered by a report from a user or a maintenance manager or by detecting a lowering in the communication system utilization efficiency due to the abnormality.

As a testing method, for example, loop-back testing in which a signal is passed through the transmitting unit and returned to the receiving unit has heretofore been carried out for each individual base station. With this testing method, however, it is difficult to judge whether or not normal radio transmission is actually performed in the air and whether or not normal radio reception can be effected. Therefore, the conventional practice is to connect a special measuring device to each base station for detection and analysis of an abnormal phenomenon to thereby perform monitoring and testing.

However, since the conventional system has no function of monitoring at all times, occurrence of an abnormality cannot be discovered until a user reports it as a problem in the ordinary service.

In the case of a problem which is difficult for a user to judge, e.g., a lowering in the transmission output, the problem cannot promptly be discovered and dealt with.

In addition, it is necessary in order to effect abnormality monitoring to provide a special device for monitoring, together with a radio signal and communication procedure therefor, which invites an increase in the cost for the maintenance operation.

SUMMARY OF THE INVENTION

It is an object of the present invention to provide a base station mutual synchronization system wherein a synchronized relationship is established by sequentially designating base stations to be synchronized from a central station.

It is another object of the present invention to provide a base station mutual monitoring system wherein a plurality of base stations monitor each other by mutually receiving a radio wave for ordinary service which is constantly transmitted from the base stations.

A gist of the present invention resides in a system for establishing mutual synchronization between base stations in a communication system that performs time-division multiple access mobile communication using radio in a service area in which are disposed a plurality of base stations which are connected to a communication network containing a central station that effects multiple-unit control. Each base station includes a control unit, a receiving unit, a transmitting unit, and a communication interface. The central station selects a specific base station from among the base stations and designates it as a master base station, and instructs a base station close to the master base station to synchronize with a radio signal from the master base station. The instructed base station synchronizes its own radio signal with the radio signal from the master base station by the synchronizer and transmits the synchronized radio wave. Next, the central station instructs a base station close to the synchronized base station to synchronize its own radio signal with a radio signal from a base station to be synchronized with, which is designated by the central station, and the instructed base station synchronizes its own radio signal. In this way, the central station gives instructions sequentially and repeatedly, thereby enabling all the base stations to synchronize their own radio signals.

By effecting mutual synchronization between the base stations as described above, the following advantages are obtained: As the central station instructs a base station to synchronize with a base station which is designated by the central station as a reference base station for synchronization, the base station instructed to achieve synchronization receives a radio wave for ordinary service, e.g., a control radio wave, from the reference base station and synchronizes its own radio wave with the radio wave from the reference base station by using the synchronizer, thereby enabling synchronization of a plurality of base stations to be sequentially achieved without externally supplying a synchronizing signal in a hardware manner.

Since each individual base station synchronizes with only one other base station, which is designated as a reference base station, it is required to effect reception for synchronization at only one timing. Therefore, the receiver for the ordinary service can be used in common. Thus, the internal arrangement of the base station is simplified.

Once synchronization is achieved, it does not vary to a considerable extent during the ordinary service. There is therefore no likelihood of occurrence of an error in synchronization with mobile stations.

Another gist of the present invention resides in a mutual monitoring system used in the above-described communication system to effect mutual monitoring between the base stations. The central station sequentially designates base stations in the service area to monitor each other, and further gives each base station a reference incoming level and a reference error generation rate as criteria for judging an abnormality, thereby establishing a monitoring network. The designated base stations receive each other's radio signals to obtain incoming levels, respectively. Further, the base stations each obtain an error generation rate from a check code (CRC check code=Cyclic Redundancy Check code) in the received data. When the incoming level and the error generation rate are not conformable to the criteria, the base station concerned informs the central station of occurrence of an abnormality through the communication network. The central station makes judgment comprehensively from abnormality reports sent from all the base stations to deduce an abnormal base station and a cause of the failure.

The above-described base station mutual monitoring system provides the following advantages: Since base stations constantly receive each other's radio signals used in the ordinary service and make judgment on the basis of the criteria, the ordinary system condition can be accurately grasped and monitored.

In addition, since the central station comprehensively judges an abnormal base station and a cause of the failure, e.g., whether transmission failure or reception failure, from abnormality reports sent from all the base stations, an accurate judgment can be readily and quickly made.

DESCRIPTION OF THE PREFERRED EMBODIMENTS

One embodiment of the present invention will be described below with reference to the accompanying drawings.

Figure 2:
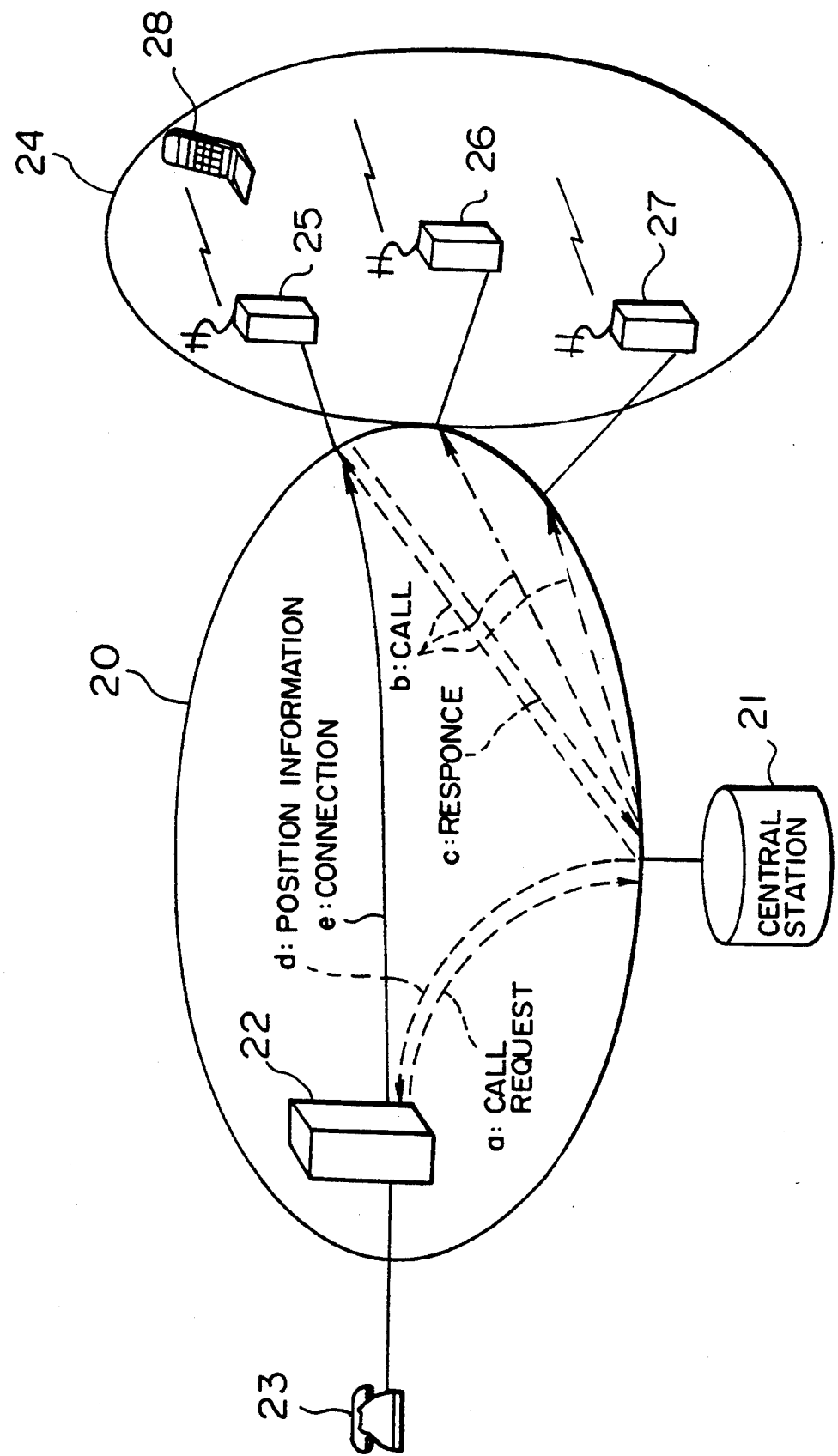
FIG. 2 shows a telephone system to which the base station mutual synchronization and monitoring system according to the present invention is applied, together with a calling sequence carried out therein.

FIG. 2 shows a telephone system to which the base station mutual synchronization and monitoring system of the present invention is applied, together with a calling sequence used therein. As illustrated in the figure, the telephone system has a plurality of base stations 25, 26 and 27 provided in a service area 24. The base stations 25, 26 and 27 are connected to a central station 21, which effects multiple-unit control, and an exchange 22 through a telephone network 20, thereby performing radio telephone communication from a base station to a mobile station 28 in the service area 24.

Figure 1:
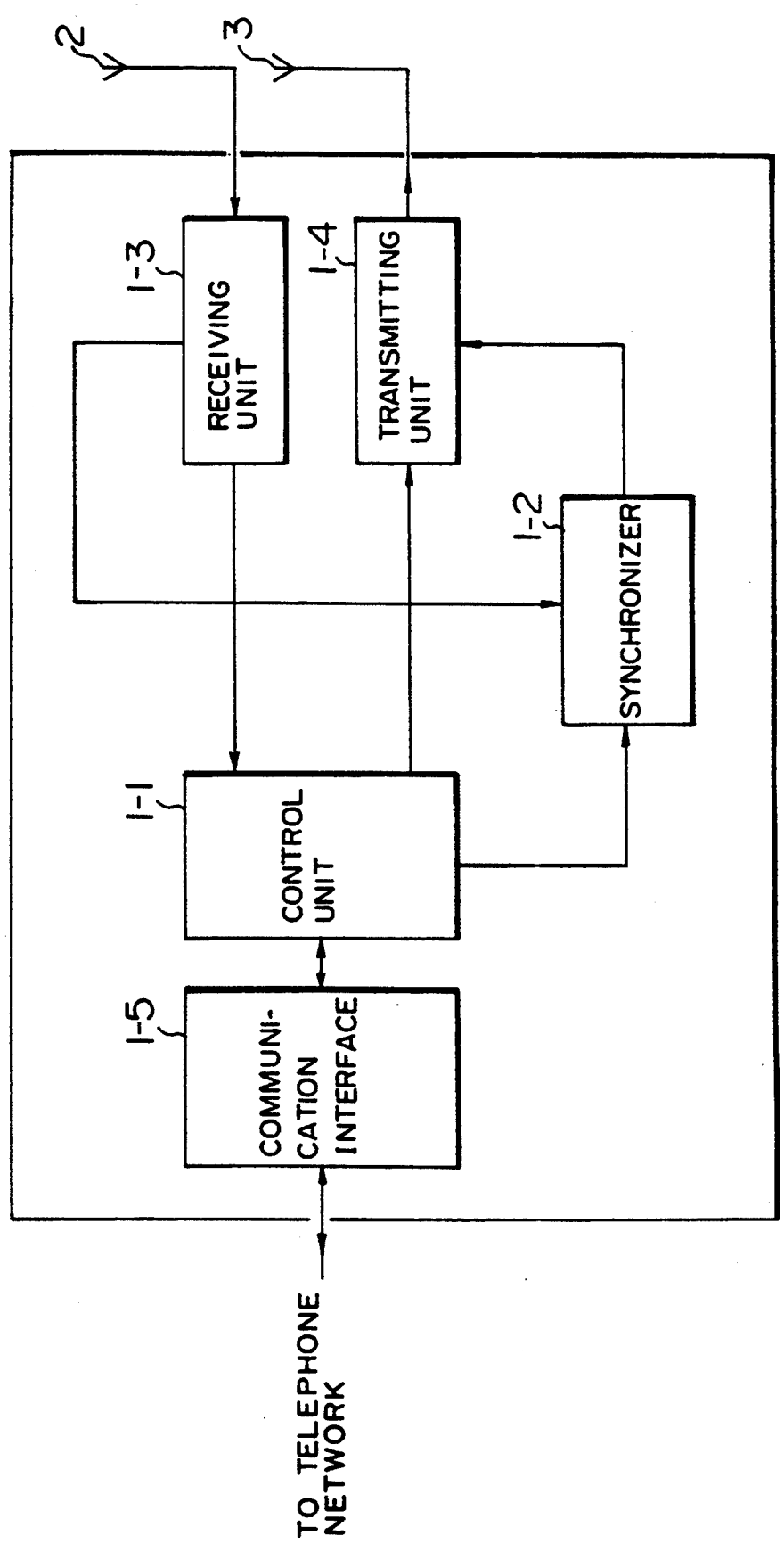
FIG. 1 is a block diagram showing the arrangement of a base station to which the base station mutual synchronization and monitoring system according to the present invention is applied.

FIG. 1 is a block diagram showing the arrangement of a base station 1 (the base stations 25, 26 and 27 shown in FIG. 2) linked to the telephone network according to the present invention.

As shown in FIG. 1, the base station 1 used in the telephone system includes a control unit 1-1 comprised of a microprocessor or the like, a synchronizer 1-2 for synchronizing the transmitting and receiving timing in this base station with radio transmission and reception, a combination of a transmitting unit 1-4 and a receiving unit 1-3 for transmitting and receiving radio signals, and a communication interface 1-5 for connecting this base station to the telephone network (the telephone network 20 in FIG. 2).

A signal from other base station is received by a receiving antenna 2, and a synchronized signal is transmitted from a transmitting antenna 3.

The control unit 1-1, which is comprised of a microcomputer or the like, analyzes data received from a base station designated as a reference base station with which this station is to synchronize, and controls the synchronizer 1-2. The synchronizer 1-2 synchronizes a radio signal to be transmitted from this station with a radio signal from the reference base station which is received by the receiving unit 1-3.

The receiving unit 1-3 converts the radio signal received by the receiving antenna 2 into received data at the timing controlled by the synchronizer 1-2 and sends the data to the control unit 1-1. The transmitting unit 1-4 converts data to be transmitted, which is sent from the control unit 1-1, into a radio signal at the timing controlled by the synchronizer 1-2 and transmits the signal from the transmitting antenna 3.

The communication interface 1-5 receives instructions from the central station through the telephone network.

It should be noted that the telephone network, which connects the central station and the base stations, may use radio waves.

The calling sequence will be explained below with reference to FIG. 2. In a case where a call is to be made from an ordinary telephone 23 to a mobile station 28, when the user dials, the exchange 22 sends a call request signal a to the central station 21. In response to the call request signal a, the central station 21 sends a call signal b to the base stations 25, 26 and 27.

The base station 25 that has the mobile station 28 within its own radio area sends a response signal c to the central station 21. The central station 21 sends the exchange 22 the number of the base station 25 as a position information signal d.

The exchange 22 connects the ordinary telephone 23 and the base station 25 through the telephone network 20. Thus, the ordinary telephone 23 and the mobile station 28 can communicate with each other through the telephone network 20 and the base station 25.

Figure 3:
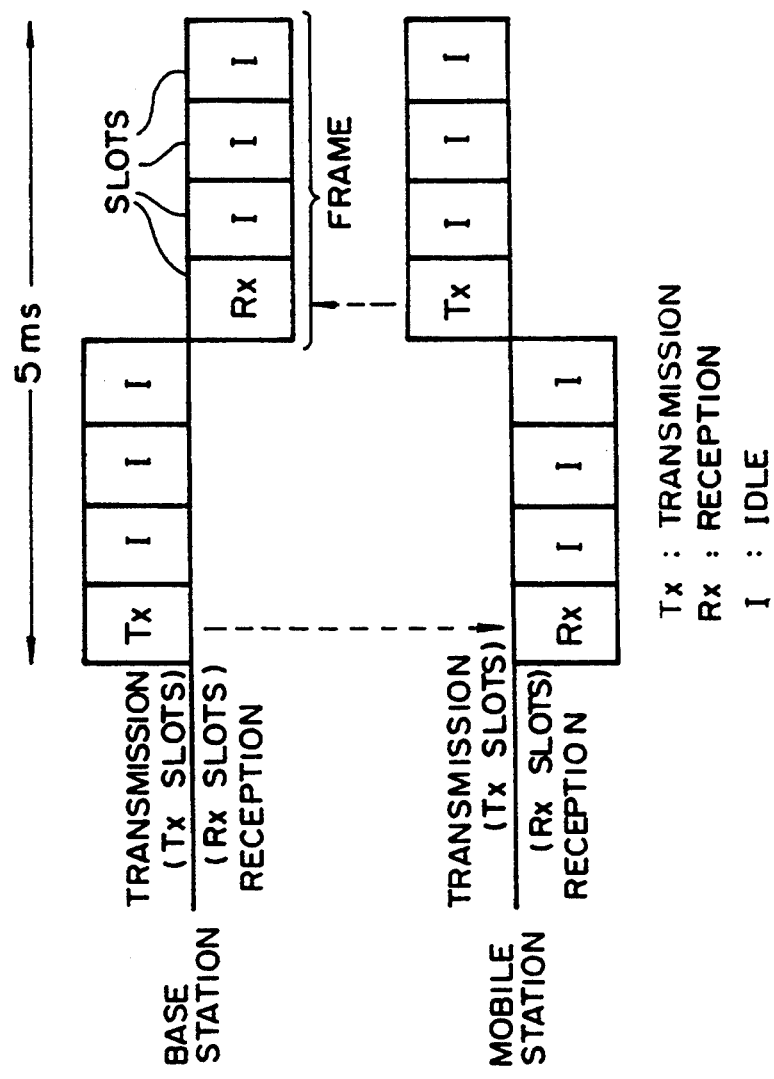
FIG. 3 shows a format of signals for communication between a base station and a mobile station using a traffic channel.

FIG. 3 shows a format of signals for communication between a base station and a mobile station using a traffic channel.

As illustrated in the figure, according to TDMA, a channel is time-divided into transmission and reception frames each having a length of time of 2.5 ms, and each frame is subdivided into 4 slots.

The frames on the transmitting and receiving sides are synchronized with each other, so that communication can be effected by using one slot. In the example shown in FIG. 3, multiplex communication of 4 calls can be performed by using a single frequency.

Accordingly, it is necessary to synchronize the transmission and reception frames at the base and mobile stations, as a matter of course. Further, since a plurality of base stations 25, 26 and 27 are installed in the same service area 24 and these base stations communicate with mobile stations using the same frequency, as shown in FIG. 2, the transmission and reception frames must be synchronized between the base stations in the service area. Therefore, synchronization control is effected by using a common control channel that is steadily transmitted during the ordinary service.

Figure 4:
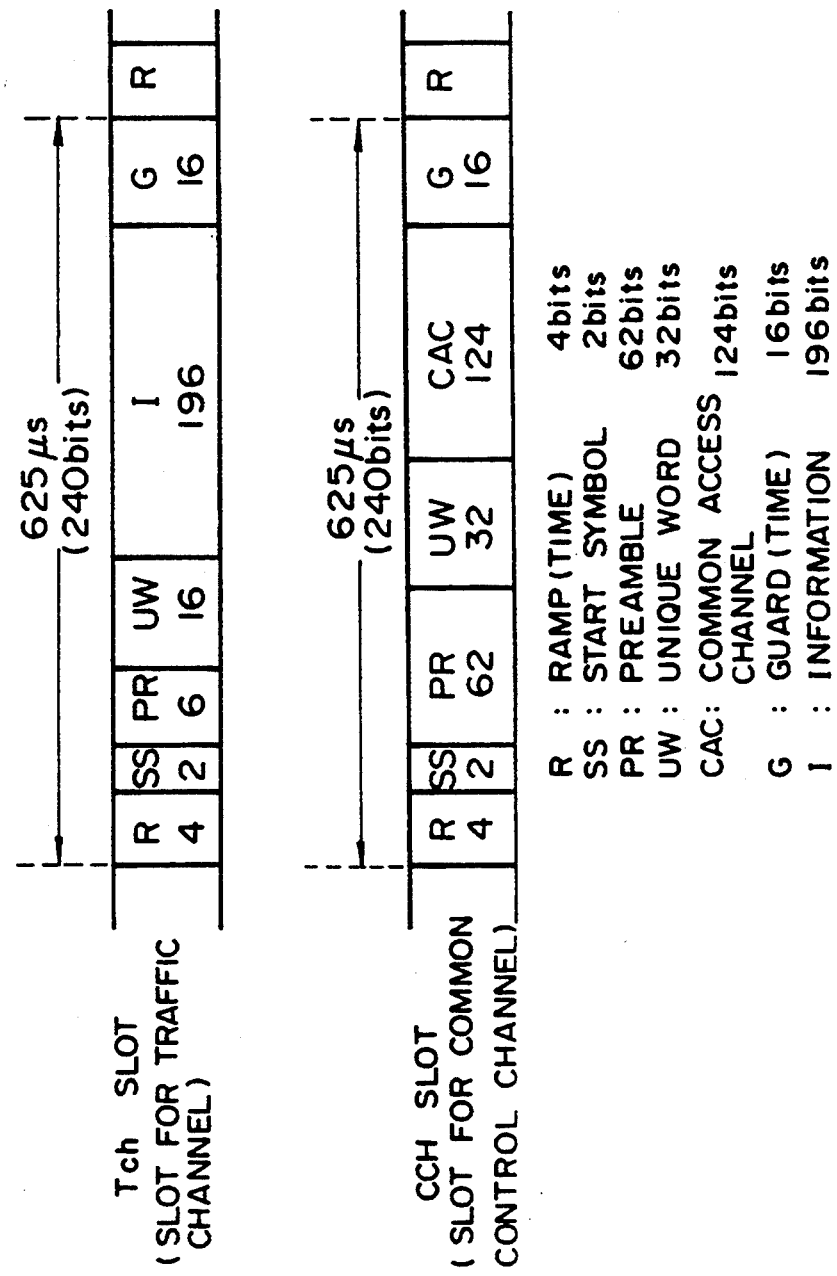
FIG. 4 shows formats of common control and traffic channel slots.

FIG. 4 shows formats of common control and traffic channel slots.

As illustrated in the figure, the common control slot is composed of a 4-bit ramp (time) R, a 2-bit start symbol SS, a 62-bit preamble PR, a 32-bit unique word UW, and a 124-bit common access channel (control signal) CAC. The common control slot is used, for example, to assign a traffic channel to a mobile station.

Since the common access channel CAC contains the ID number of each particular base station, a receiving station can identify the originating base station.

Figure 5:
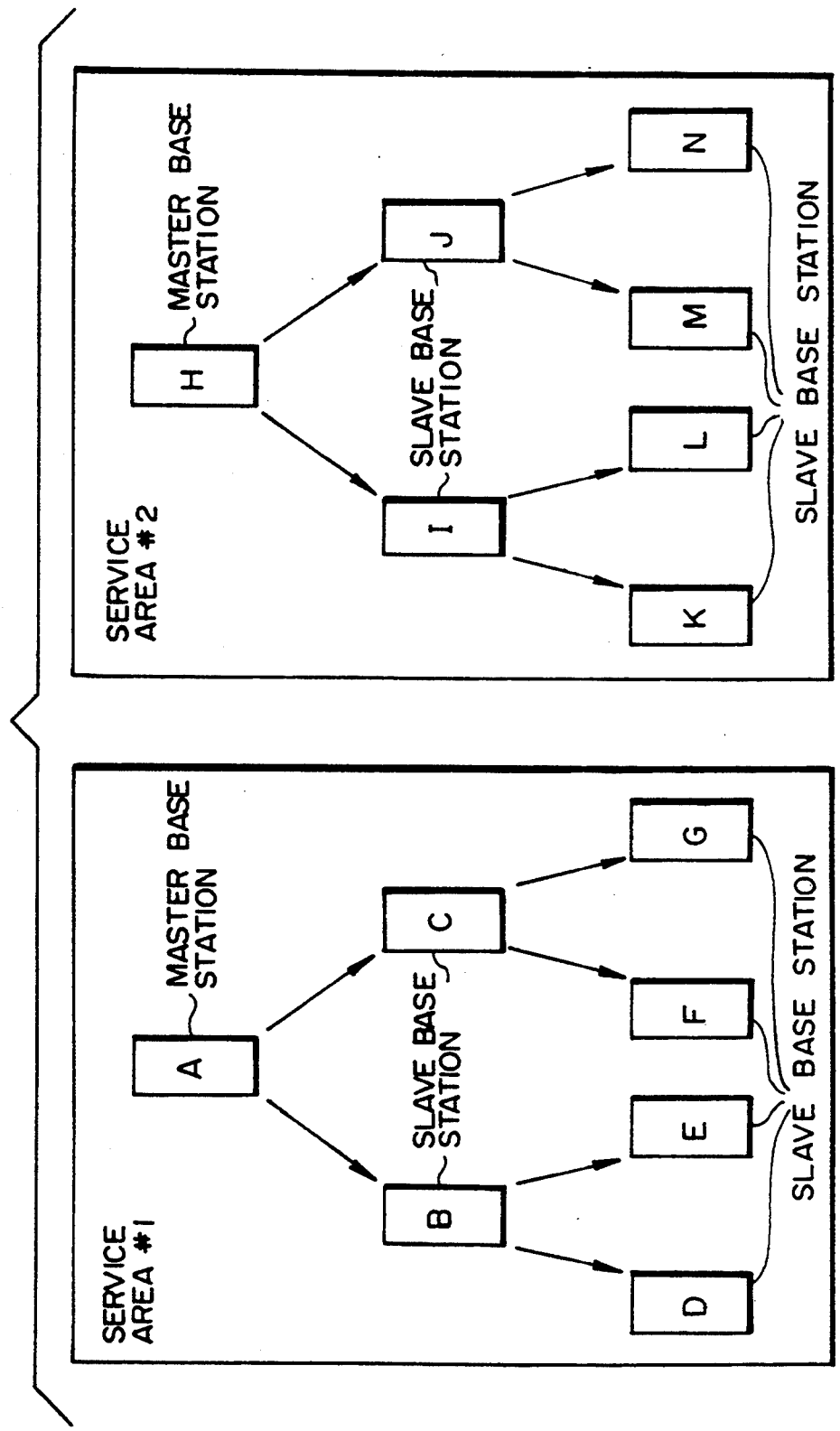
FIG. 5 shows the flow of synchronization of base stations in service areas.

FIG. 5 shows the flow of synchronization of base stations in service areas. The flow of synchronization of base stations in each service area will be explained below with reference to FIG. 5.

The central station 21, which effects multiple-unit control, selects one base station A from among base stations in a service area #1 and designates it as a master base station. Next, the central station 21 instructs base stations B and C (slave base stations) to synchronize with the master base station A.

Figure 6:
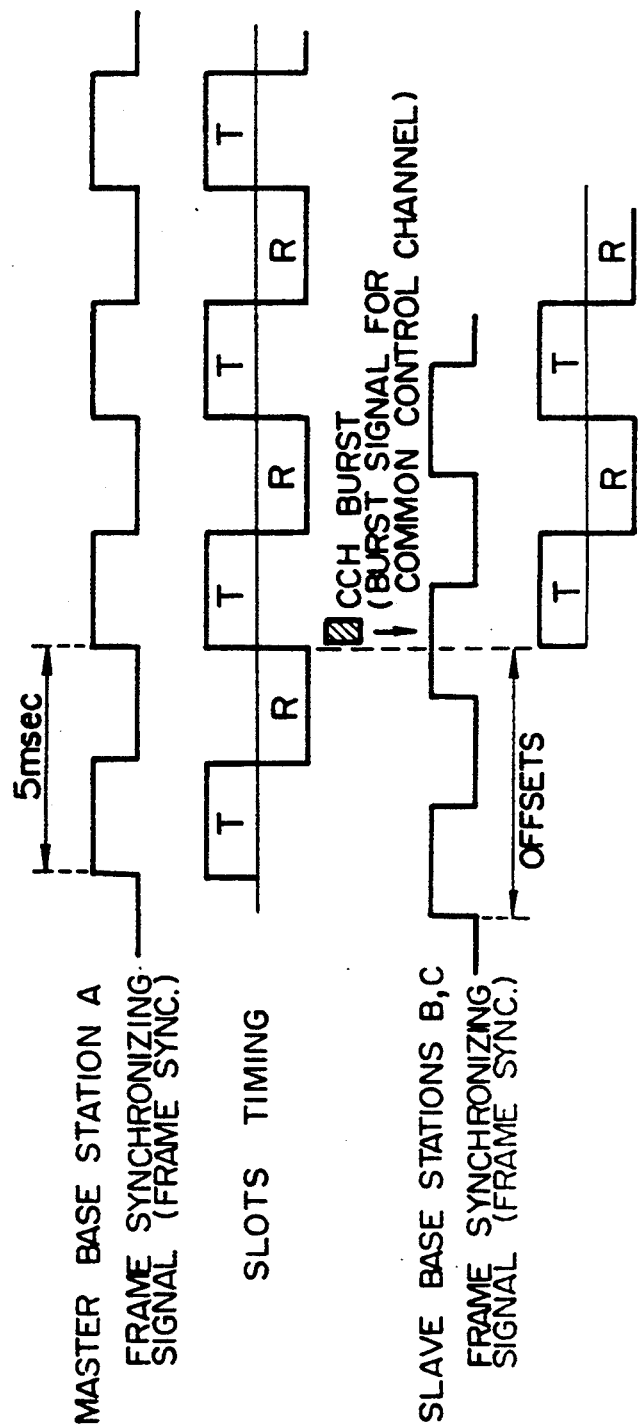
FIG. 6 shows a method of obtaining frame synchronization between base stations.

FIG. 6 shows a method whereby a slave base station achieves frame synchronization with a master base station.

As illustrated in FIG. 6, the slave base stations B and C each receive a radio wave from the master base station A at the receiving unit 1-3 (see FIG. 1), confirms the common control channel signal at the control unit 1-1, and adjusts the offset time at the synchronizer 1-2, thereby controlling its own transmitting timing. Thus, the slave base stations B and C achieve frame synchronization with the master base station A and effect transmission at the timing controlled in this way.

Similarly, the central station 21 instructs slave base stations D and E to synchronize with the slave base station B and also instructs slave base stations F and G to synchronize with the slave base station C. In this way, the base stations A to G in the service area #1 can synchronize with the master base station A, which is designated as a center of synchronization.

Similarly, base stations H to N in a service area #2 are synchronized with a master base station H designated as a center of synchronization.

In this case, service areas can readily be changed or combined. For example, when there is an interference between the base stations G and K in FIG. 5 because these base stations are close to each other, the service areas #1 and #2 are combined together, and the process is repeated from the step of designating a master base station to reestablish synchronization, thereby maintaining the synchronization in the service area.

Figure 7:
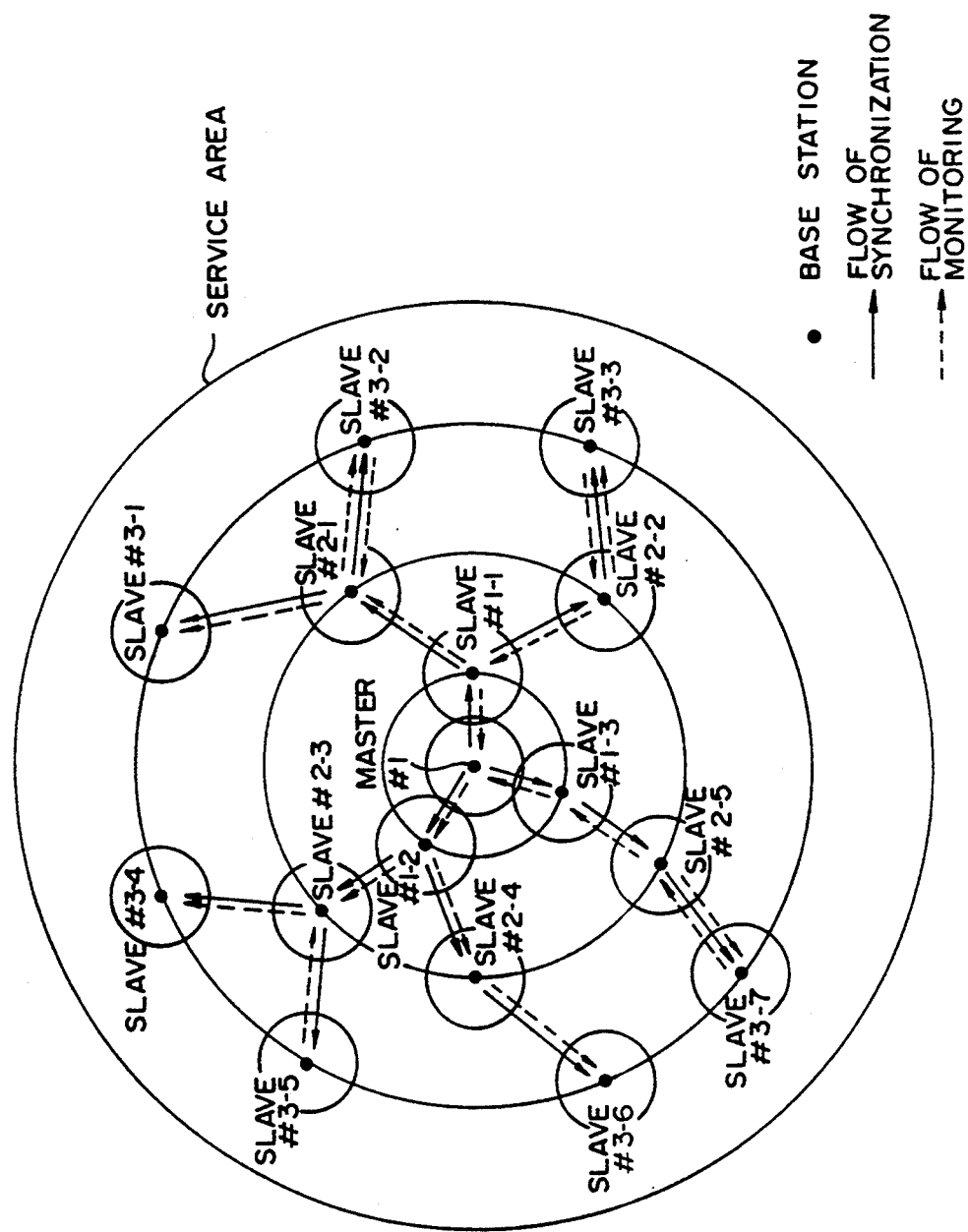
FIG. 7 shows the layout of base stations in a service area, together with the flow of synchronization and the flow of monitoring.

FIG. 7 shows the layout of base stations in a service area, together with the flow of synchronization.

The central station 21 (see FIG. 2) designates a base station in the vicinity of the center of the service area as a master base station #1. Then, the central station 21 designates base stations in an area within which radio waves from the master base station #1 reach as slave base stations and instructs them to obtain synchronization.

Thereafter, the central station 21 sequentially instructs the base stations to synchronize with respective base stations, which are designated as reference base stations to be synchronized with, thereby enabling synchronization to be established among all the base stations in the service area, that is, the master base station #1, the slave base stations #1-1 to 1-3, the slave base stations #2-1 to 2-5, and the slave base stations #3-1 to 3-7.

Next, the system for mutual monitoring between base stations according to the present invention will be described. The arrangement of base stations to which the monitoring system of the present invention is applied, the arrangement of a telephone system, the formats of signals for communication between base and mobile stations, and the formats of common control and traffic channel slots are the same as those shown as examples in FIGS. 1 to 4.

Figure 8:
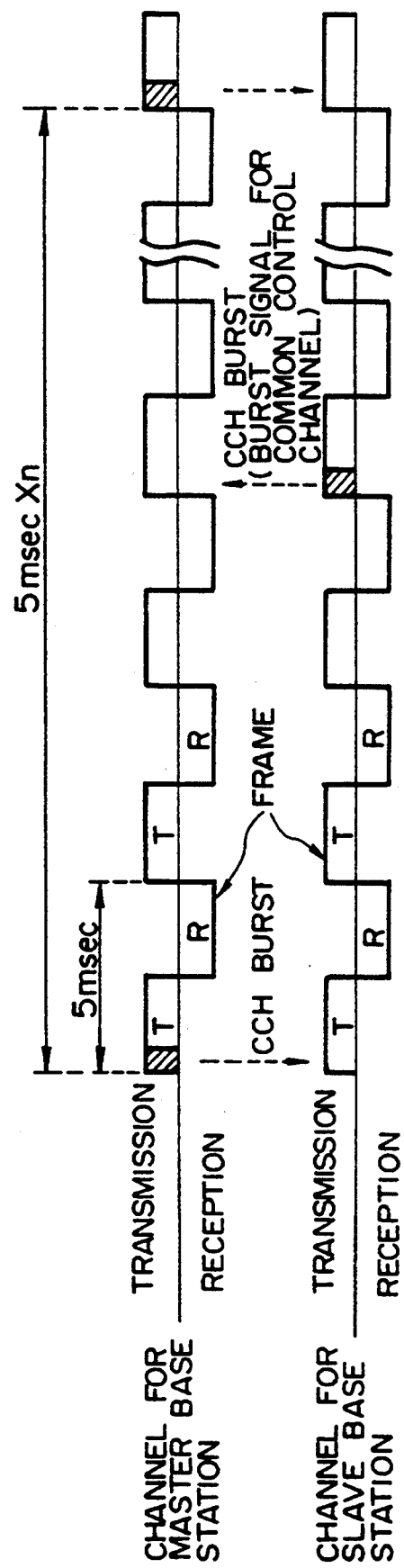
FIG. 8 shows the common control channel transmission timing in each base station.

FIG. 8 shows the common control channel transmitting timing at each of a pair of base stations. As illustrated in the figure, the channels of the base stations (a master base station and a slave base station) are synchronized with each other, and these base stations mutually effect abnormality monitoring by receiving each other's common control channel signals, which are intermittently transmitted.

The central station designates for each base station a base station to be monitored by it. Base stations which are designated to effect mutual monitoring are preferably in the master-slave relation between base stations synchronized with each other.

As shown in FIG. 7, the central station 21 (see FIG. 2) sequentially designates base stations for mutual monitoring and informs each base station of a base station to be monitored thereby in the order in which synchronous relationship has been established for all the base stations in the service area i.e., the slave base stations #1-1 to 1-3, the slave base stations #2-1 to 2-5, and the slave base stations #3-1 to 3-7, about the master base station #1 present in the center of the service area as shown by the dotted-line arrows. Thus, a monitoring network is established. Further, the central station 21 gives each base station a reference error generation rate (CRC error generation rate) and a reference signal level (RSSI low-level slot detectivity) as criteria for judgment of an abnormality (CRC: cyclic redundancy check; RSSI: receiving signal strength indicator).

Each base station receives a radio signal from a base station designated by the central station 21 to obtain an error generation rate and an incoming level of the common control channel signal, and compares them with the reference error generation rate and the reference signal level, which are given by the central station 21. If the error generation rate and the incoming level are not conformable to the criteria, the base station judges that there is an abnormality, and informs the central station 21 of the occurrence of an abnormality through the telephone network 20.

Referring to FIG. 7, in a case where the slave base station #2-1 monitors the slave base station #3-2 and judges that there is no abnormality, whereas the slave base station #3-2, which monitors the slave base station #2-1, judges that there is an abnormality, and these base stations each inform the central station 21 of the result of the judgment through the telephone network 20, the central station 21 judges that there is a strong possibility of the slave base station #3-2 having an abnormality in reception if no abnormality is found as a result of monitoring of the slave base station #2-1 by the slave base station #1-1 and as a result of monitoring of the slave base station #3-1 by the slave base station #2-1.

Thus, the central station 21 collects results of monitoring of the ordinary service conditions from each base station at all times, and makes judgment comprehensively. Accordingly, it is possible to deduce a base station having the highest probability of being abnormal and also a cause of the failure.

With the above-described base station mutual monitoring system, since base stations constantly receive each other's radio signals used in the ordinary service and make judgment on the basis of the criteria, the ordinary system condition can be accurately grasped and monitored.

In addition, since the central station comprehensively judges an abnormal base station and a cause of the failure, e.g., whether transmission failure or reception failure, from abnormality reports sent from all the base stations, an accurate judgment can be readily and quickly made.

Furthermore, since monitoring is carried out using a radio wave for the ordinary service, no special equipment is needed on the transmitting side. Thus, the cost is reduced.

The present invention may be carried out in various other forms without departing from the spirit and essential features thereof. Therefore, the above-described embodiments are merely illustrative examples, and the present invention should not be construed as being limited to the described embodiments. The technical scope of the present invention is defined by the appended claims, and it is not bound to this specification. Furthermore, all changes and modifications within the technical scope of the claims come within the scope of the present invention.

What we claim is:

1. A method of establishing mutual synchronization among base stations in a communication system that performs time-division multiple access mobile communication using radio in a service area in which are disposed a plurality of base stations that are connected to a communication network containing a central station that effects multiple-unit control, the method comprising:
   (A) providing each of the plurality of base stations with transmission means for transmitting a radio signal, reception means for receiving a radio signal, synchronization means for controlling synchronization of a radio signal, and communication means for communicating with the central station,
   (B) selecting, via the central station, one base station from among the plurality of base stations and designating the selected base station as a master base station,
   (C) selecting, via the central station, at least one other base station from among the plurality of base stations and designating the selected base station as a selected base station, the selected base station being relatively closer to the master base station than any of the other base stations,
   (D) instructing, via the central station, the synchronization means of the selected base station to synchronize a radio signal transmitted by the selected base station with a radio signal transmitted by the master base station and to thereby transmit a synchronized radio wave,
   (E) selecting, via the central station, at least one additional base station from among the plurality of base stations, the at least one additional base station being relatively closer to the selected base station than any of the other base stations,
   (F) instructing, via the central station, the synchronization means of the at least one additional base station to synchronize a radio signal transmitted by the additional base station with a radio signal transmitted by the selected base station and to thereby transmit a synchronized radio wave, and
   (G) repeating steps (C) through (F) until substantially all of the plurality of base stations are transmitting a synchronized radio wave.

2. A method for effecting mutual monitoring among base stations in a communication system that performs time division multiple access mobile communication using radio in a service area in which are disposed a plurality of base stations which are connected to a communication network containing a central station that effects multiple-unit control, the method comprising:
   providing each of the plurality of base stations with transmission means for transmitting a radio signal and communication means for communicating with the central station,
   establishing a monitoring network by directing the central station to sequentially designate at least a first one of the plurality of base stations in the service area to monitor at least a second one of the base stations in the service area through the communication network,
   providing, via the central station, each one of the plurality of base stations with a reference incoming level and a reference error generation rate as criteria for determining abnormality,
   using the first base station to receive a radio signal from the second base station to thereby obtain an incoming level and an error generation rate,
   informing the central station of an occurrence of an abnormality through the communication network when the incoming level and the error generation rate received by the first base station does not conform to at least one of the reference incoming level and the reference error generation rate, and
   identifying, via the central station, an abnormal base station and a cause of failure based upon a comprehensive review of information received by the central station from all of the base stations.

* * * * *